United States Patent [19]

Frost

[11] 3,792,677
[45] Feb. 19, 1974

[54] PRESSURE INDICATOR FOR PNEUMATIC TIRE WHEELS

[76] Inventor: John E. Frost, 10 W. Braddock Dr., Somers Point, N.J. 08244

[22] Filed: June 12, 1972

[21] Appl. No.: 261,704

[52] U.S. Cl................ 116/34 R, 73/146.8, 137/227
[51] Int. Cl. ........................................... B60c 23/02
[58] Field of Search............ 116/34 R, 34 B, 65, 70; 73/146.3, 146.8; 137/227, 228

[56] References Cited
UNITED STATES PATENTS

| | | | |
|---|---|---|---|
| 1,481,654 | 1/1924 | Thomas............................ | 116/34 B |
| 3,075,538 | 1/1963 | Stafford.......................... | 137/227 X |
| 3,129,689 | 4/1964 | Henderson et al................ | 116/34 R |
| 3,129,690 | 4/1964 | Nygard............................. | 116/34 R |
| 3,610,269 | 10/1971 | Adams.............................. | 73/146.8 |
| 3,670,688 | 6/1972 | Seaberg............................ | 73/146.8 |

*Primary Examiner*—Louis J. Capozi

[57] ABSTRACT

A hollow chamber having an internal flexible diaphragm and carried by a pneumatic tire wheel in fluid communication with the pneumatic pressure thereof on one side of the diaphragm, a tubular stem extending shiftably into the chamber on the other side of the diaphragm and anchored to the latter for extension and retraction upon flexure of the diaphragm, a check valve in the stem, and resilient means urging the stem and diaphragm toward said one side of the latter against the pneumatic pressure of the tire wheel.

8 Claims, 3 Drawing Figures

PATENTED FEB 19 1974
3,792,677

PRESSURE INDICATOR FOR PNEUMATIC TIRE WHEELS

BACKGROUND OF THE INVENTION

As is well known in the field of pneumatic tires, the pneumatic pressure thereof is necessarily maintained at a predetermined minimum, reduction below the minimum being injurious to the tire and indicating the existence of a leak. Accordingly, it has been proposed in the past to provide indicator means for signaling the reduction of tire pressure below a predetermined minimum, to avoid damage to equipment as well as the possibility of serious accident and physical injury. However, prior proposed pneumatic pressure indicator means have been relatively complex in construction, expensive to manufacture and install, readily subject to malfunction, also requiring new habits and procedures to be learned by the user, and otherwise not suited for wide commercial acceptance.

SUMMARY OF THE INVENTION

It is, therefore, an important object of the present invention to provide a pressure indicator for pneumatic tire wheels which overcomes the above-mentioned difficulties, is extremely simple in structure, relatively inexpensive to manufacture and sell, being capable of quick and easy installation as original equipment, or attachment by the individual owner to existing equipment.

It is a further object of the present invention to provide a pressure indicator having the advantageous characteristics mentioned in the preceding paragraph, which is extremely durable and reliable throughout a long useful life, and adapted to indicate satisfactory minimum tire pressure by mere visual observation or sense of touch, say in darkness.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENTS

Figure 1:
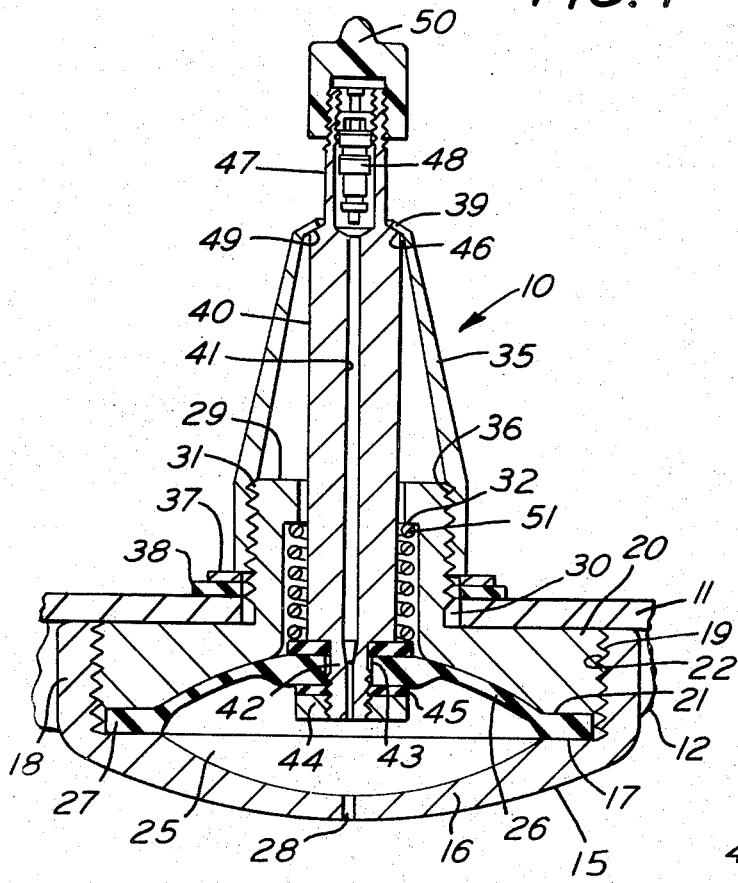
FIG. 1 is a longitudinal sectional view showing a pressure indicator constructed in accordance with the teachings of the present invention, in operative association with a rim of a wheel, illustrating the chamber or body of the indicator internally of the tire.

Referring now more particularly to the drawings, and specifically to FIG. 1 thereof, a pneumatic tire wheel includes a wheel rim 11, and a tire 12 carried upon the rim, in what may be the conventional manner.

A pressure indicator of the present invention is generally designated 10, and is carried by the wheel, being specifically carried by the rim 11. More particularly, the pressure indicator 10 includes a hollow chamber part casing part 15, which may be generally circular, being composed of a generally circular, dished or cupped part 16 formed with an annular outwardly facing shoulder 17 and a generally cylindrical peripheral wall 18 outstanding from the shoulder circumferentially thereabout and provided with internal screw threads 19. A generally circular mating casing or chamber part 20 is internally dished, being formed with a generally annular shoulder 21 and external circumferential screw threads 22. The chamber part 20 is located in facing relation with respect to the chamber part 15, the external and internal screw threads 22 and 19, respectively, being in threaded engagement with each other, and the shoulders 21 and 17, respectively, being in facing spaced relation. Thus, as seen in FIG. 1, the mating chamber part 16 and 20 combine to define therebetween an interior hollow 25 which may be of generally circular configuration in a plane transverse to FIG. 1.

A flexible membrane or diaphragm 26 is located in the hollow 25 of chamber 15, extending thereacross, having its peripheral margin 27 extending entirely about and clamped in the space between the facing shoulders 17 and 21. The flexible diaphragm or membrane 26 thus extends entirely across the interior hollow 25, and further is flexible between a pair of extreme opposite positions in facing engagement with the internal surfaces of respective chamber parts 16 and 20. An opening, port or hole 28 is formed in the chamber part 16, to establish fluid communication between the interior of the tire 12 and the interior of hollow 25 on one side of the diaphragm 26.

The part 20 is formed with a central tubular nipple or neck 29 having its opposite ends open and projecting away from the chamber 15 through an aperture or hole 30 in the wheel rim 11 to the exterior of the pneumatic pressure space within the tire 12. The neck or nipple 29 may be externally threaded, as at 31, and may be provided with an internal annular shoulder 32 facing toward the space 25 and diaphragm 26.

An open ended tubular body or housing 35 has one end internally threaded, as at 36, and circumposed about and in threaded engagement with the screw threads 31 of the nipple 29. The housing 35 may be threaded onto the nipple 29 and serve to clamp a washer 37 and seal 38 against the region of rim 11 bounding rim opening 30. Thus, the rim 11, seal 38 and washer 37 are clamped between the chamber part 20 and adjacent end of housing 35 to mount the chamber 15 on the rim interiorly of the tire 11.

The tubular housing 35 projects beyond the nipple or neck 29 and terminates in an inturned end flange 39. Longitudinally shiftable in the nipple 29 and housing 35 is an elongate tubular stem 40. The stem 40 has an open ended through bore 41, one end portion being reduced, as at 42 and extending through a central aperture 43 in the diaphragm 26. A nut 44 may be threadedly circumposed about the lower stem end portion 42 and engaging a washer 45 to clamp the diaphragm 26 at its central region bounding the aperture 43. In this manner, the end region 42 of the tubular stem 40 is anchored to the diaphragm.

Within the housing 35, the stem 40 may be provided with an external annular shoulder 46, and a reduced external end portion 47 extends beyond the shoulder 46 exteriorly of the housing 35. A conventional one-way or check valve 48 may be mounted in the stem 40 in any suitable manner.

It will now be appreciated that the stem 40 is longitudinally shiftable between an extended position as shown in FIG. 1, and a retracted position with the diaphragm 26 moved against the chamber part 16, and the reduced stem extension 47 retracted into the housing 35. There may be provided an annular seal 49 interposed between the stem shoulder 46 and housing flange 39. Removably secured over the distal end region of stem 40, as by screw threads or other suitable means, may be a cap 50. The external surface of the reduced extension 47, as between the cap 50 and the shoulder 46, may be decorated or marked, as by an attention attracting color, for clear visibility, by two distinct color bands for comparing the sizes of the bands to each other for purposes appearing presently.

Circumposed about the tubular stem 40, within the neck or nipple 29, may be a suitably resilient member, such as coil compression spring 51. The spring 51 has one end engaging the internal shoulder 32 of the nipple 29, and its other end engaging the diaphragm 26, to urge the latter downwardly or toward the chamber part 16.

In operation, say initially inflating the tire 12, the dust cap 50 is removed and the spring 51 is expanded to shift the stem 40 inwardly to its limiting position with the diaphragm against the chamber part 16. The diaphragm is designed so as not to be unduly distended and strained when in engagement with the chamber parts 16 and 20. The stem end portion 47 remains exteriorly of the housing 35 sufficiently to engage in an air hose fitting, the valve element 48 being depressed in the usual manner by the air hose fitting to admit air through the stem to chamber 25 and through opening 28 to the interior of tire 12. When the desired air pressure is reached within the tire 12, the air supply hose is removed and the cap 50 replaced. The pneumatic pressure within the tire then communicates through the chamber opening 28 with the chamber 25 to flex the diaphragm 26 away from chamber part 16 against the force of resilient means 51 to compress the latter, and thereby shift stem 40 to a projected position, showing two distinct equal bands of contrasting color. Should the tire 12 lose air and the pneumatic pressure thereof be reduced sufficiently, the spring 51 will displace the diaphragm 26 and the tubular stem 40 to retract the latter and conceal the previously exposed stem region 47. This indicates dangerously low pressure within the tire 12. This indication may be observed visually from a standing position by a single walk around the car, or by feeling for sufficient space between the flange 39 and cap 50 if it were dark.

While the foregoing description has illustrated operation for use in signaling a dangerously low pneumatic pressure, which is believed adequate for most purposes, the instant device may also be employed to indicate excessively high pneumatic pressure, if desired. For example, the resilient means or spring 51 may be properly calibrated to locate the stem 40 at an intermediate position of its longitudinal shifting within the satisfactory range of pneumatic pressure. This intermediate position may be noted by a marking on the stem region 47 or other suitable means, and should the marking be exposed beyond the housing 35, this will indicate excessive pressure in the tire. Of course, pressure may be reduced by depressing valve element 48 until proper pressure is indicated. In this air removal, as well as air filling operation, the user performs in substantially the normal manner as with conventional valve stems.

While the pressure indicator 10 of FIG. 1 illustrates the chamber 15 as disposed within the tire 12, it is appreciated that the chamber may be exteriorly of the tire and provided with suitable fluid communication with the interior thereof.

Figure 2:
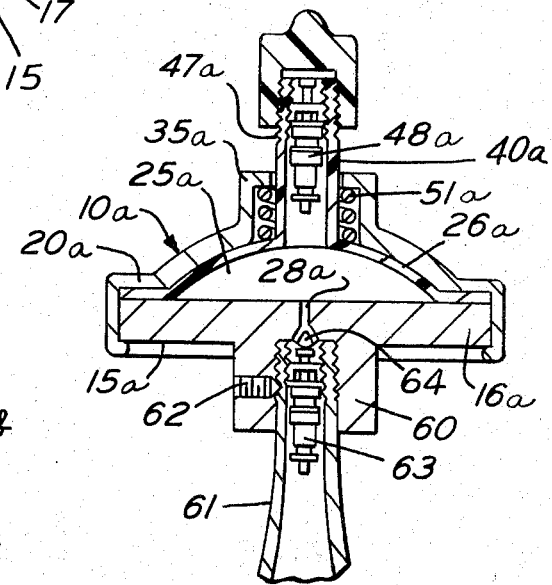
FIG. 2 is a longitudinal sectional view showing a slightly modified embodiment of pressure indicator of the present invention as applied to the valve stem of the tire exteriorly thereof.

For example, in the embodiment of FIG. 2, there is shown a pressure indicator 10a wherein a hollow chamber 15a includes a pair of mating chamber parts 16a and 20a secured together to define therebetween an interior chamber hollow 25a. A flexible diaphragm 26a extends interiorly across the chamber 15a, the chamber part 16a being formed centrally with an air port 28a on one side of the diaphragm, and the chamber part 20a being provided with a generally tubular extension or housing 35a on the other side of the diaphragm. An open ended tubular stem or neck 40a has one end anchored centrally to the diaphragm 26a, opening through the latter, and has its other end projecting exteriorly of the housing 35a, as stem region 47a. The stem 40a may be provided internally with a one-way check valve 48a, and suitable resilient means, such as a coil spring 51a may be employed to resiliently urge the diaphragm 26a toward chamber part 16a to retract the stem 40a, all against the pneumatic pressure of a wheel.

Additionally, the pressure indicator 10a of FIG. 2 is provided exteriorly on chamber part 16a with an internally threaded tubular coupling part or nipple 60 surrounding the opening 28a, which provide an attachment or mounting means for mounting the indicator onto a conventional valve stem 61 of a wheel. That is, the valve stem 61 may be conventional, including a one-way valve 63, and the chamber part 16a is provided interiorly of the coupling 60 with protuberance 64 engageable with the valve element 63 to maintain the latter open and assure fluid communication between the chamber 25a and the interior of a tire. To deter theft and tampering, the coupling 60 may be provided with a radial set screw 62.

It will now be appreciated that use and operation of the pressure indicator 10a are essentially the same as the pressure indicator 10.

Figure 3:
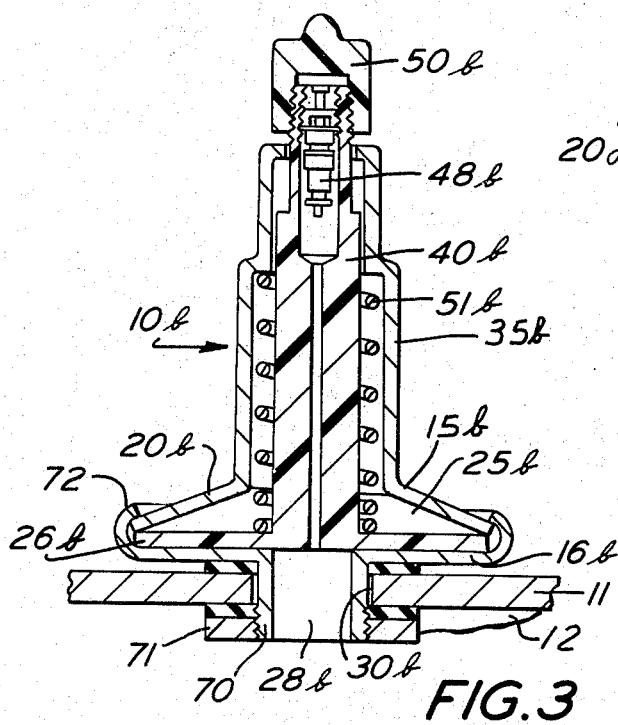
FIG. 3 is a longitudinal sectional view showing another slightly modified embodiment of the present invention as applied to the rim of a wheel exteriorly of the tire.

While the pressure indicators 10 and 10a are believed suitable for use as either original equipment, as by automotive vehicle manufacturers, as well as for use on existing equipment, as by subsequent attachment thereto, there is shown in FIG. 3 a pressure indicator generally designated 10b which may be more suitable for installation during wheel manufacture.

The indicator 10b is shown as mounted exteriorly on a wheel rim 11 which carries a tire 12. A generally circular chamber 15b is composed of a circular chamber part 16b having a central tubular extension 70 defining a through opening 28b. The tubular extension 70 extends through a rim aperture or hole 30b and is provided on the opposite side of the rim (interiorly of the tire 12) with a securement member 71 clamping the chamber part 16b in position.

An additional chamber part 20b combines with the chamber part 16b to define therebetween a hollow interior 25b, the chamber part 16b and 20b being secured together by a peripheral flange 72 extending about the part 16b and clamped over the marginal bounding edge of the chamber part 20b.

Extending across the internal hollow 25b of chamber 15b is a flexible diaphragm 26b having its peripheral margin clamped between the peripheral margin of the chamber parts 15b and 16b. The diaphragm 26b is displaceable between facing engagement with the chamber part 16b and the chamber part 20b.

A tubular housing 35b extends from the chamber part 20b, and an internal open ended tubular stem 40b extends shiftably within the tubular housing 35b, one end of the stem being anchored to and opening centrally through the diaphragm 26b. The other stem end projects through and beyond the distal end of housing 35b, and is provided with a one-way valve 48b and removable cap 50b. Interiorly of the housing 35b there may be provided suitable resilient means, such as a coil compression spring 51b resiliently urging the stem 40b toward its retracted position, with the diaphragm 26b toward the chamber part 16b. Here again, use and operation of the embodiment of FIG. 3 may be essentially identical to that of the first described embodiments.

From the foregoing it is seen that the present invention provides a pressure indicator for pneumatic wheels which is extremely simple in construction, foolproof in operation, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A pressure indicator for pneumatic tire wheels comprising a hollow casing for attachment to a wheel, a flexible diaphragm extending across the interior of said casing, said casing having an opening on one side of said diaphragm in fluid communication with the pneumatic pressure of a pneumatic tire wheel, a housing extending outwardly from said casing terminating in an outer end and in fluid communication with the interior of said casing on the other side of said diaphragm, a tubular stem shiftable in said housing having one end extending outwardly through and beyond the outer end of said housing for extension and retraction therethrough, the other end of said stem being anchored to and opening through said diaphragm for stem shifting upon diaphragm flexure, a one-way inlet valve in said stem for passing gas inwardly through said stem and diaphragm to said one diaphragm side and through said opening into a pneumatic tire wheel, and resilient means operatively interconnected between said casing and diaphragm for urging flexure of the latter to retract said stem against the pneumatic pressure of a pneumatic tire wheel and indicate a reduction in pressure.

2. A pressure indicator according to claim 1, in combination with mounting means mounting said casing on the rim of a wheel.

3. A pressure indicator according to claim 2, said mounting means mounting said casing on the outer periphery of the wheel rim with said housing extending through the wheel rim internally thereof.

4. A pressure indicator according to claim 2, said mounting means mounting said chamber on the internal side of the wheel rim and said opening communicating through the wheel rim.

5. A pressure indicator according to claim 1, in combination with mounting means mounting said chamber on the wheel valve stem.

6. A pressure indicator according to claim 1, said diaphragm being flexible into facing engagement with opposite internal sides of said casing to limit diaphragm stress.

7. A pressure indicator according to claim 1, in combination with indicia means on said stem for exposure beyond said housing outer end to indicate safe minimum pneumatic pressure, said indicia means comprising a pair of equi-width marks, so that unequal width of marks exposed by said housing indicates insufficient pressure.

8. A pressure indicator according to claim 1, said resilient means comprising a coil compression spring circumposed about said stem.

* * * * *